(12) United States Patent
Herkt et al.

(10) Patent No.: US 7,121,013 B2
(45) Date of Patent: Oct. 17, 2006

(54) LENGTH SENSOR

(75) Inventors: Peter Herkt, Traun (DE); Ludwig Böge, Jenapriessnitz (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 54 days.

(21) Appl. No.: 10/474,569

(22) PCT Filed: Mar. 28, 2002

(86) PCT No.: PCT/EP02/03478

§ 371 (c)(1),
(2), (4) Date: Apr. 26, 2004

(87) PCT Pub. No.: WO02/084208

PCT Pub. Date: Oct. 24, 2002

(65) Prior Publication Data

US 2004/0154178 A1 Aug. 12, 2004

(30) Foreign Application Priority Data

Apr. 11, 2001 (DE) ................................ 101 18 069

(51) Int. Cl.
*G01B 3/00* (2006.01)

(52) U.S. Cl. ............................. 33/551; 33/556; 33/555; 33/559

(58) Field of Classification Search .................. 33/551, 33/556, 557, 559, 560, 561, 503, 549, 553, 33/554, 555
See application file for complete search history.

(56) References Cited

U.S. PATENT DOCUMENTS 2,663,945 A * 12/1953 Emery .......................... 33/556
2,995,825 A * 8/1961 Harping et al. ................ 33/560
4,110,611 A * 8/1978 Tann et al. .................... 33/559
4,136,458 A * 1/1979 Bell et al. ...................... 33/561
4,187,614 A * 2/1980 Abiru et al. ................... 33/559
4,288,925 A * 9/1981 McMurtry ..................... 33/561
4,347,492 A   8/1982 Davis et al.
4,453,313 A * 6/1984 Rinn ............................ 33/557
4,575,947 A * 3/1986 Stauber ........................ 33/561
4,631,831 A * 12/1986 Bacher et al. ................ 33/558
4,658,510 A * 4/1987 Zanier .......................... 33/549
4,661,037 A * 4/1987 Sugino et al. ................ 33/559
4,925,598 A   5/1990 Kivistö et al.
5,072,174 A   12/1991 Weber
5,174,039 A   12/1992 Murai
5,208,993 A   5/1993 Harding (Continued)

FOREIGN PATENT DOCUMENTS

DE       29 48 712 A1      6/1981

(Continued)

*Primary Examiner*—Diego Gutierrez
*Assistant Examiner*—Travis Reis

(57) ABSTRACT

A length measuring probe that includes a base body, a guide element and a probe pin having a touch scanning element for touch scanning a measuring object, the probe pin is seated, displaceable in relation to the base body in a measuring direction opposite a spring force F via the guide element. A detection device detects a position of the probe pin with respect to the base body and a first spring element and a second spring element arranged behind the first spring element in the measuring direction so as to prestress the probe pin. The guide element is arranged between the first and second spring elements, on which facing end areas of the first and second spring elements are fixed in place, and wherein the at least one guide element is seated, displaceable in the measuring direction, on the probe pin and on the base body.

13 Claims, 2 Drawing Sheets

U.S. PATENT DOCUMENTS 5,414,940 A     5/1995   Sturdevant
5,659,969 A *   8/1997   Butler et al. .................. 33/561
5,669,152 A *   9/1997   McMurtry .................. 33/559

FOREIGN PATENT DOCUMENTS

| | | |
|---|---|---|
| DE | 37 19 509 A1 | 12/1988 |
| DE | 40 33 924 A1 | 5/1991 |
| DE | 199 07 644 A1 | 8/2000 |
| DE | 199 31 226 A1 | 1/2001 |
| DE | 199 37 204 C1 | 2/2001 |

* cited by examiner

LENGTH SENSOR

Applicants claim, under 35 U.S.C. §§ 120 and 365, the benefit of priority of the filing date of Mar. 28, 2002 of a Patent Cooperation Treaty patent application, copy attached, Ser. No. PCT/EP02/03478, filed on the aforementioned date, the entire contents of which are incorporated herein by reference, wherein Patent Cooperation Treaty patent application Ser. No. PCT/EP02/03478 was not published under PCT Article 21(2) in English.

Applicants claim, under 35 U.S.C. § 119, the benefit of priority of the filing date of Apr. 11, 2001 of a German patent application, copy attached, Serial Number 101 18 069.1, filed on the aforementioned date, the entire contents of which are incorporated herein by reference.

BACKGROUND OF THE INVENTION

1. Field of the Invention

The present invention relates to a length measuring probe.

2. Description of the Related Art

Such length measuring probes are employed in manufacturing technology for measuring workpieces. For example, the thickness, width, length, depth, as well as the inner or outer diameters can be determined.

A length measuring probe is described in U.S. Pat. No. 5,072,174, the entire contents of which are incorporated herein by reference. A probe pin is seated in a base body by a guide element of a ball bearing guide, so that it is displaceable in the longitudinal direction. The contact pressure required for scanning a workpiece to be measured by touch is generated by a helical spring, whose one end is fixed on the probe pin and the other end on the base body.

The length of the helical spring must correspond at least to the lift of the probe pin, however, long helical springs have a tendency to kink laterally. The greater the desired lift of the probe pin, the longer the ball bearing guide must be embodied in order to be able to absorb the lateral forces introduced by the probe pin in the course of touch scanning because of the lever effect. Therefore length measuring probes with a relatively large measuring range—i.e. lift of the probe pin—are constructed to be relatively long.

For shortening the structural length of a length measuring probe, two ball bearing guides are provided in accordance with U.S. Pat. No. 4,347,492, the entire contents of which are incorporated herein by reference, which are spaced apart from each other. A detection device for detecting the position of the probe pin is arranged between these two ball bearing guides. The helical spring is located in a bore in the probe pin, which requires a relatively thick probe pin. In the case where a large lift of the probe pin is required and a long helical spring is used, the problem of kinking also occurs here, which causes friction between the helical spring and the probe pin.

SUMMARY AND OBJECTS OF THE INVENTION

It is an object of the present invention to create a length measuring probe which is constructed to be compact and solid, even with a relatively large lift of the probe pin, or wherein the guide element does not adversely affect the measuring process.

This object is attained by a length measuring probe that includes a base body, a guide element and a probe pin having a touch scanning element for touch scanning a measuring object, the probe pin is seated, displaceable in relation to the base body in a measuring direction opposite a spring force F via the guide element. A detection device detects a position of the probe pin with respect to the base body and a first spring element and a second spring element arranged behind the first spring element in the measuring direction so as to prestress the probe pin. The guide element is arranged between the first and second spring elements, on which facing end areas of the first and second spring elements are fixed in place, and wherein the at least one guide element is seated, displaceable in the measuring direction, on the probe pin and on the base body.

The advantages of the present invention lie in that the helical springs are arranged in a space-saving manner, and the probe pin is seated over the entire lifting distance in a manner in which the transverse forces are stabilized. Kinking of the helical springs is prevented by dividing a long helical spring into several short helical springs with guide elements arranged between them. There is now the possibility of employing helical springs which generate a small pressure or tensional force F and do not kink in spite of their thin walls and the therefore small spring constant. By this an interfering friction between the probe pin and the windings of the helical springs, which would affect the service life and accuracy of measurement of the helical springs, is prevented. It is now possible to select the arrangement in such a way that during the measuring operation the scale fastened to the probe pin dips into the windings of at least one of the helical springs.

A further advantage which is obtained by the present invention is the defined movement of the guide element. The helical springs always maintain the guide element in a defined manner between the springs, in case of equal spring properties in the center between the springs because of the equilibrium of the forces.

Exemplary embodiments will be explained in greater detail in the subsequent description in connection with the drawings.

Shown are in:

DESCRIPTION OF THE PREFERRED EMBODIMENT(S) OF THE INVENTION

Figure 1:
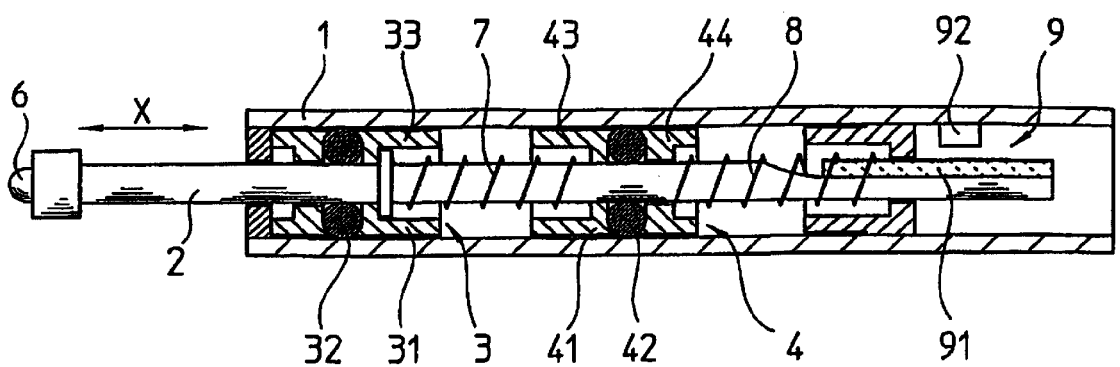
FIG. 1 shows a sectional view of an embodiment of a length measuring probe in accordance with the present invention in an extended end position of the probe pin.

An exemplary embodiment of a length measuring probe designed in accordance with the present invention will be described in what follows by FIGS. 1 and 2. The drawing figures schematically show a cross section of the entire length measuring probe, includes a base body 1 in which a rod-shaped probe pin 2 is seated, displaceable in the measuring direction X.

Figure 2:
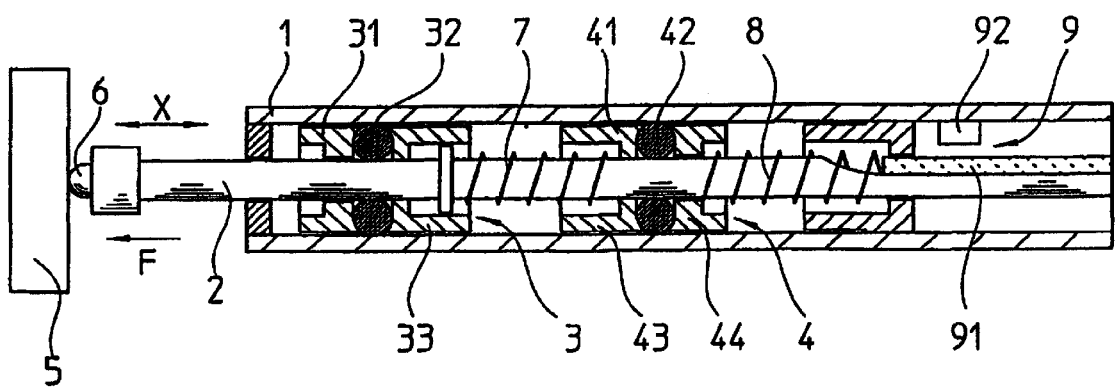
FIG. 2 shows a sectional view of the length measuring probe in accordance with FIG. 1 in a touch scanning position.

For touch scanning a workpiece 5 represented in FIG. 2, the end of the probe pin 2 is spherically designed as a touch scanning element 6. In the course of a touch scanning process, the touch scanning element 6 of the probe pin 2 is forced with a force F onto the surface of the workpiece 5 to be measured. This force F is generated by helical springs 7 and 8, which are arranged one behind the other in the measuring direction X and force the touch scanning element 6 onto the workpiece 5. For a space-saving construction, the windings of the helical springs 7, 8 extend around the circumference of the round probe pin 2. For preventing friction between the probe pin 2 and the helical springs 7, 8 in the course of the touch scanning movements of the probe pin 2, a free space between the probe pin 2 and the windings of the helical springs 7, 8 is provided over the circumference.

A detection device 9 is provided for measuring the linear displacement of the probe pin 2 with respect to the base body 1. In a known manner it includes a scale 91 and a scanning unit 92 for scanning the measurement graduation of the scale 91. The scale 91 is fastened on the probe pin 2, and the scanning unit 92 opposite the latter on the base body 1. Position-dependent electrical signal are generated by the scanning unit 92 and are supplied to a display unit or an evaluation unit. The measurement graduation of the scale 91 can be embodied in such a way that it can be scanned opto-electrically, capacitively, magnetically or inductively. For a particularly space-saving construction, the scale 91 has such dimensions that it can dip into the windings of the helical spring 8 during lifting movements of the probe pin 2. To this end, the axial distance between the stationary scanning unit 92 and the rear end of the helical spring 8 is less than the possible lift of the probe pin 2, or than the measuring range of the detection device 9.

Guidance of the probe pin 2 in the base body 1 is provided by several guide elements, which are arranged one behind the other in the measuring direction X and are in particular designed as ball bearing guides 3 and 4. One of these ball bearing guides 3 is arranged at the end of the base body 1 toward the touch scanning side. In order to be able to absorb the transverse forces introduced in the course of touch scanning by the probe pin 2 well, at least one further ball bearing guide 4 is arranged at a distance from it. For a particularly space-saving construction, this further ball bearing guide 4 is arranged between the two helical springs 7 and 8. In this case the first helical spring 7 is supported at one end on the probe pin 2, and with the other end on the ball bearing guide 4. In the same way one end of the helical spring 8 is supported on the opposite side of this ball bearing guide 4, while the other end of this helical spring 8 is supported on the base body 1.

Each one of these ball bearing guides 3 and 4 includes a ball bearing cage 31 and 41, with balls 32 and 42 rotatably seated therein, which on the one side roll off on the inner surface of the base body 1 and on the other side on the surface of the probe pin. Since the helical springs 7 and 8 are compression springs, they are fixed in place on the ball bearing cages 31 and 41 by being axially supported in the measuring direction X on the ball bearing cages 31, 41. In the support area, the ball bearing cages 31, 41 have a cup-shaped section 33, 43, 44, which extends around the helical springs 7, 8.

The ball bearing guide 4 is axially clamped between the two helical springs 7 and 8 and is movable in the measuring direction X in relation to the probe pin 2, as well as the base body 1, but transversely to this is seated without play on the probe pin 2 and on the base body 1. In the course of lifting movements of the probe pin 2 in the measuring direction X, the position of the ball bearing guide 4 is matched to the position of the helical springs 7, 8, it is always in the center position between the two helical springs 7, 8, provided these have the same spring constant.

The arrangement represented in FIGS. 1 and 2 has the advantage that relatively short ball bearing guides 3, 4 are sufficient for supporting transverse movements of the probe pin 2 well. In comparison to a single long helical spring, kinking of the helical springs 7, 8 is prevented by the ball bearing guide 4 between the two helical springs 7 and 8, since their ends are well guided by the ball bearing guide 4.

It is particularly advantageous if the base body 1 is designed in one piece over the entire range of all ball bearing guides 3 and 4 in order to prevent alignment errors of the guide surfaces on the base body 1.

Other guide elements, for example sliding bearings, can also be employed instead of the ball bearing guides 3 and 4. In the course of this it is also possible to replace the ball bearing guide 3 on the touch scanning side by a slide bearing fixed in place on the base body 1, or by a circulating ball bearing guide fixed in place on the base body 1. However, if the ball bearing guide 4 is replaced by a sliding bearing, the latter has an outer sliding face between the bearing body and the base body 1, as well as an inner sliding face between the bearing body and the probe pin 2, in order to achieve the free mobility of the bearing body in relation to the base body 1, as well as the probe pin 2, in the axial direction X, as well as freedom from play transversely to it.

The guide element in the form of a ball bearing guide 4 or of a bearing body of a sliding bearing clamped between the two helical springs 7, 8 follows the lifting movement of the probe pin 2 by matching its position to the position of the helical springs 7, 8. When using two helical springs 7, 8, each helical spring 7, 8 is compressed by one half the lift movement of the probe pin 2. It is possible to also arrange further helical springs behind each other in addition to the two helical springs 7, 8, wherein advantageously a guide element, in particular a ball bearing guide 4, is arranged between two of these helical springs.

If the ball bearing guide 4 between the two helical springs 7, 8 is designed to be appropriately transversely stable, the probe pin 2 can also be exclusively guided by this ball bearing guide 4, and the ball bearing guide 3 on the touch scanning side can be omitted, which will be explained later by an example.

For automating the touch scanning procedure it is possible to provide a compressed air connector on the length measuring probe for generating a force which acts counter to the touch scanning force F of the compression springs 7, 8 and lifts the probe pin 2 off the workpiece 5.

Figure 3:
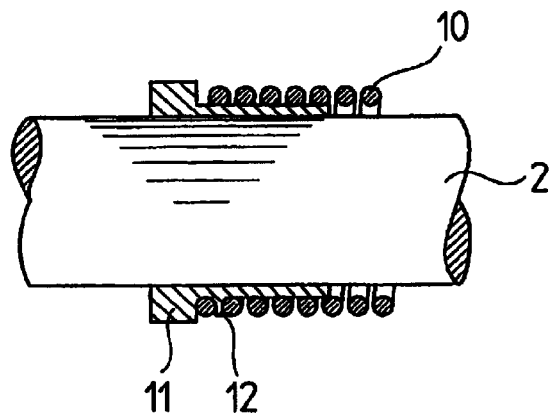
FIG. 3 shows a portion of a second embodiment of a length measuring probe with a tension spring fixed in place in it in accordance with the present invention.

The helical springs 7 and 8 can also be embodied as tension springs instead of as compression springs. By the tension springs, the probe pin 2 is in its position of rest in the retracted state. The touch scanning force F is pneumatically generated by compressed air in a known manner in that the compressed air is conducted into the interior of the length measuring probe and by this a linear movement of the probe pin 2 is initiated. If the touch scanning is to be terminated in an automated way, the compressed air is shut off with the result that the probe pin 2 is lifted off the workpiece by the tension springs and is retracted back into its position of rest. When using tension springs in place of compression springs 7, 8, the ends of the tension springs are fixed in place on the probe pin 2, the base body 1 and the guide elements 3, 4. This fixation in place can be provided by gluing, welding or a positive connection. A positive connection is particularly advantageous, an example of this is represented in FIG. 3. FIG. 3 shows the fixation in place of one end of a helical tension spring 10 on the probe pin 2. For fixation in place a sleeve 11 has been pressed on the circumference of the probe pin 2. This sleeve 11 has a collar 12 extending over a portion of its circumference, under which the end of the tension spring 10 has been screwed. The collar 12 can extend level, i.e. is produced by a groove in the sleeve 11, or the collar 12 can extend helically on the circumference of the sleeve 11 with a lead in the longitudinal direction X.

Figure 4:
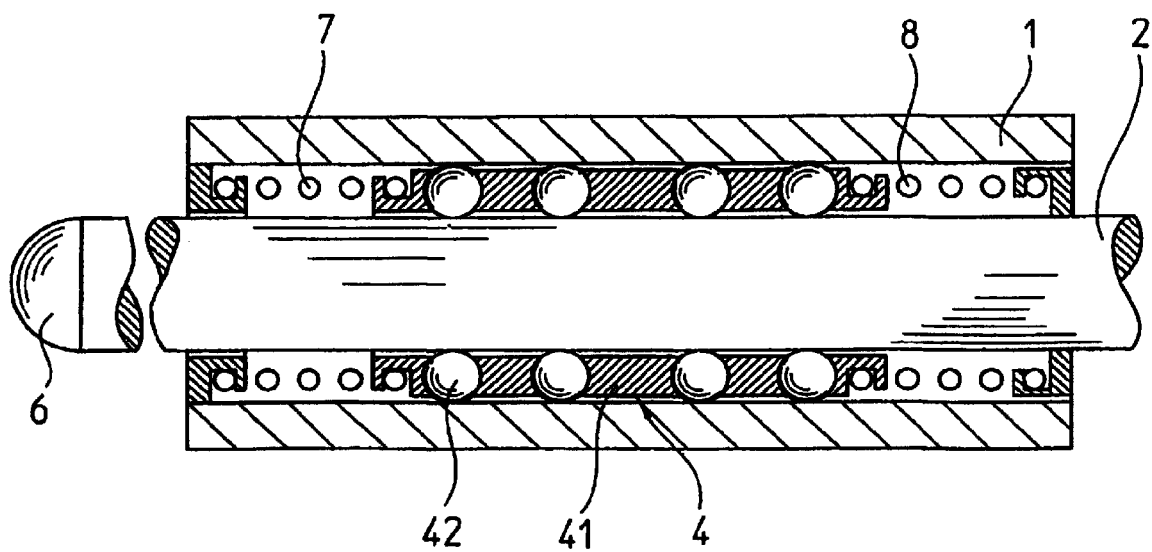
FIG. 4 shows a sectional view of a further embodiment of a length measuring probe in accordance with the present invention.

FIG. 4 represents a further exemplary embodiment of a length measuring probe. Different from the embodiments in accordance with FIGS. 1 and 2, no ball bearing guide 3 is provided here on the touch scanning side. The probe pin 2 is prestressed by the two helical springs 7 and 8, or is maintained in a position of rest and is prestressed during a touch scanning movement. The ball bearing guide 4 is arranged between the two helical springs 7, 8, and the ends of the helical springs 7, 8 associated with it are supported thereon (in the case of compression springs), or—as represented—they are fixed thereon by being fastened when using tension springs. For this fastening, end areas of the ball bearing cage 4 can each have a collar 12, identified in FIG. 3, for the positive hooking of the helical springs 7, 8. Moreover, one of the helical springs 7 is supported on the base body 1, and the other helical spring 8 on the probe pin 2. Advantageously the two helical springs 7, 8 have the same spring properties, so that the ball bearing guide 4 is centered between the support point on the base body and the support point at the probe body 2 in every position of the probe body 2 with respect to the base body 1.

With all embodiments, a permanent displacement of the ball bearing guide 4, caused by acceleration, blows or guidance inaccuracies, is prevented. The two helical springs, embodied as compression or tension springs, assure that any undesired displacement of the ball bearing guide 4 in the measuring direction X is compensated by restoring forces of the helical springs 7, 8. Because of this, the capability of the length measuring probe to function is assured, because the ball bearing guide 4 cannot be displaced into any end position, which would cause the braking of the probe pin movement.

The present invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A length measuring probe, comprising:
   a base body;
   a guide element;
   a probe pin comprising a touch scanning element for touch scanning a measuring object, said probe pin is guided, displaceable in relation to said base body along a measuring direction opposite a spring force F via said guide element;
   a detection device that detects a position of said probe pin with respect to said base body;
   a first spring element and a second spring element arranged behind said first spring element in said measuring direction so as to prestress said probe pin with said first spring element and said second spring element in a common direction; and
   wherein said guide element is arranged entirely between said first and second spring elements, and wherein said guide element is guided, displaceable in said measuring direction, on said probe pin and on said base body.

2. The length measuring probe in accordance with claim 1, wherein said probe pin is prestressed by said first and second spring elements, wherein a first end area of said first spring element is fixed in place on said probe pin, and a second end area of said first spring element is fixed in place on said guide element, and a first end area of said second spring element is fixed in place on said guide element, and a second end area of said second spring element on said base body.

3. The length measuring probe in accordance with claim 1, wherein said guide element comprises a ball bearing guide.

4. The length measuring probe in accordance with claim 3, wherein said ball bearing guide comprises a ball bearing cage and balls rotatably seated in said bearing cage, and wherein said first and second end areas of both said first spring element and said second spring element are fixed in place on said ball bearing cage.

5. The length measuring probe in accordance with claim 1, wherein said probe pin is guided, displaceable in said measuring direction, by a second guide element on said base body.

6. The length measuring probe in accordance with claim 5, wherein said second guide element comprises a ball bearing guide between said probe pin and said base body.

7. The length measuring probe in accordance with claim 5, wherein said second guide element is rigidly fixed in place on said base body.

8. The length measuring probe in accordance with claim 5, wherein on said second guide element neither said first spring element nor said second spring element has been fixed in place.

9. The length measuring probe in accordance with claim 1, wherein each of said first and second spring elements comprises a helical spring in the form of a compression spring.

10. The length measuring probe in accordance with claim 1, wherein each of said first and second spring elements comprises a helical spring in the form of a tension spring.

11. The length measuring probe in accordance with claim 1, wherein said first and second spring elements have substantially identical spring properties, so that said guide element is maintained centered between said first and second spring elements.

12. The length measuring probe in accordance with claim 1, wherein said detection device measures the amount of displacement of said probe pin.

13. The length measuring probe in accordance with claim 1, wherein said detection device measures the amount of linear displacement of said probe pin.

* * * * *